(12) United States Patent
Honjo

(10) Patent No.: US 6,792,196 B1
(45) Date of Patent: Sep. 14, 2004

(54) REPRODUCTION METHOD AND REPRODUCTION APPARATUS

(75) Inventor: Masahiro Honjo, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/390,768

(22) Filed: Sep. 7, 1999

(30) Foreign Application Priority Data

Sep. 7, 1998 (JP) .......................................... 10-252411

(51) Int. Cl.⁷ ................................................ H04N 5/91
(52) U.S. Cl. ......................... 386/68; 386/111; 386/125
(58) Field of Search ............................ 386/46, 68, 111, 386/112, 125, 126, 95

(56) References Cited

U.S. PATENT DOCUMENTS 5,438,423 A * 8/1995 Lynch et al. ................. 386/109
5,841,938 A * 11/1998 Nitta et al. .................... 386/68
5,974,224 A * 10/1999 Nagata ......................... 386/109

* cited by examiner

*Primary Examiner*—Huy Nguyen
(74) *Attorney, Agent, or Firm*—Wenderoth, Lind & Ponack, L.L.P.

(57) ABSTRACT

A reproduction method and a reproduction apparatus store past coded data streams previous to a frame displayed at present, or past decoded image data, to use the stored data in displaying past images, thereby considerably reducing a time for displaying the past images. The reproduction apparatus has a reproduction circuit for reproducing a coded data stream which is obtained by reading out a video signal by a reproduction head, a first memory for temporarily storing the coded data stream, a decoder circuits for decoding the coded data stream read out from the first memory, a second memory for temporarily storing decoded image data from the decoder circuits, an output circuits for outputting the decoded image data from the second memory or the decoder circuits as a video signal, and a third memory for storing past data, the third memory being provided at an output of the first memory.

62 Claims, 5 Drawing Sheets

REPRODUCTION METHOD AND REPRODUCTION APPARATUS

FIELD OF THE INVENTION

The present invention relates to a method and an apparatus for reproducing a video signal and, more particularly, to a reproduction method and a reproduction apparatus for reproducing past image data of coded data using a MPEG coding method.

BACKGROUND OF THE INVENTION

In the MPEG coding method, video signals are coded by three coding methods of an intra frame coding (I, Intra Picture), a forward prediction coding (P, Prediction picture), and a bidirectional prediction coding (B, Bidirection picture). It is already known that pictures from an Intra Picture to the next Intra Picture constitute one GOP (Group of Picture) unit.

Conventionally, when data is reproduced using the MPEG coding method, the data is generally reproduced in GOP units. Accordingly, in reproducing from a storage type recording medium, such as an optical disk, when a frame which has been displayed previously to a frame displayed presently should be displayed again, that is, when reverse reproduction should be performed, a coded data stream previous to the presently displayed frame is reproduced again from a head of a GOP including the data stream from a coded data generating unit, to decode and display the frame.

FIG. 5 is a block diagram illustrating a prior art reproduction apparatus.

In the figure, reference numeral 5 designates an optical disk on which video signals are recorded. Numeral 6 designates a reproduction head for reading out data which is stored on the optical disk 5. Numeral 7 designates a reproduction circuit for reproducing the data read out by the reproduction head 6. Numeral 1 designates a first memory for temporarily storing the data of the reproduction circuit 7. Numeral 8 designates a decoder circuit for reading out and decoding the data stored in the first memory 1. Numeral 2 designates a second memory for temporarily storing data decoded by the decoder circuit 8. Numeral 9 designates an output circuit for outputting the data stored in the second memory 2, as a video signal.

An operation of the thus constructed reproduction apparatus will be described with reference to FIG. 5.

Initially, video signals are coded by the three coding methods of the intra frame coding (I), the forward prediction coding (P), and the bidirectional prediction coding (B). Then, a GOP is constituted by pictures in a cycle of the intra frame coding (I), and coded data which is coded in a variable bit rate, with a data amount of each GOP varying with images, is recorded on a storage type recording, medium, such as the optical disk 5.

The coded data recorded on the optical disk 5 is read out by the reproduction head 6, a coded data stream is obtained by the reproduction circuit 7, and the coded data stream is temporarily stored in the first memory 1. The decoder circuit 8 reads out the data from the first memory 1 and decodes the readout data to generate a decoded signal. The decoded signal generated by the decoder circuit 8 is output by the output circuit 9 as a video signal, through the second memory 2, and sent to a terminal 12.

Here, since the coded data streams are coded in the variable bit rate, the coded data streams are reproduced intermittently from the optical disk 5. That is, the coded data streams are temporarily buffered by the first memory 1, and thereafter read out in response to a request from the decoder circuit 8. The first memory 1 is indispensable for performing this buffering.

Here, the decoded signal generated by the decoder circuit 8 can be directly output to the output circuit 9 without passing through the second memory 2. This operation is already used in products, such as a DVD player, and widely known.

As described above, in the prior art reproduction method and reproduction apparatus, coded data streams which are not decoded or displayed yet, i.e., coded data streams of frames to be displayed in the future, are stored in the first memory 1, and past coded data streams which have been displayed previously to an image which is displayed at present are not stored anywhere. Therefore, when operations such as an inverse reproduction, a reverse reproduction, a rewind reproduction, or reproduction of a past designated frame, for again displaying a past frame previous to the presently displayed frame should be performed, the first frame of a GOP including a coded data stream of a frame to be displayed is read out again, reproduced and decoded.

Next, an operating method for displaying past frames again will be described with reference to FIG. 3.

FIG. 3 is a diagram schematically illustrating a data arrangement of coded data streams on a track of an optical disk. Each GOP usually comprises about 15 frames of data. The first frame of each GOP is coded by the intra frame coding (I). In addition, frames other than the first frame are coded by the forward prediction coding (P) or the bidirectional prediction coding (B).

In the figure, image signal data stored on the optical disk 5 is coded in order of GOP1, GOP2, GOP3, and GOP4. It is assumed that a frame A is displayed at present and then, a frame B which is a past frame displayed previously to the frame A should be displayed. Here, the frame B is included in GOP4. The frame B can be coded by either the forward prediction coding (P) or the bidirectional prediction coding (B). Further, the frame B can be a frame which is adjacent to the frame A or a frame which is not adjacent to the frame A.

Conventionally, in order to decode and display the frame B which is past data, the first frame of a GOP including the frame B from the optical disk 5 should be detected, and then the frame B is decoded again. That is, in order to display the frame B in FIG. 3, a frame 14 is detected and then data of the frame 14 is read out from the optical disk 5 again by using the reproduction head 6.

However, in this prior art reproduction method and apparatus, in order to display the frame B as the past data, a seek time for the reproduction head 6 to detect the frame 14, a time for sending the data to the reproduction circuit 7 and further, though the first memory 1, to the decoder circuit 8, and a time for decoding frames of from 14 to B are required, whereby it takes quite a long time. Particularly, the seek time for the reproduction head 6 to detect the frame 14 is quite long, due to a delay time by the reproduction apparatus.

Further, when a coded data generating unit is an optical disk, a time for reproducing data again from the optical disk is additionally required, whereby it takes an increased amount of time to decode and display the data. Further, when the coded data generating unit is a device for receiving broadcasting, such as satellite broadcasting, past image data cannot be reproduced.

SUMMARY OF THE INVENTION

The present invention is made to solve the above-mentioned problems, and it is an object of the present invention to provide a reproduction method and a reproduction apparatus, which can store past coded data streams which are previous to a frame displayed at present or past decoded image data in a storage, and read out the stored data when the past image data should be displayed, thereby considerably reducing the time required to display the past image data.

Other objects and advantages of the present invention will become apparent from the detailed description and specific embodiments described are provided only for illustration, since various additions and modifications within the spirit and scope of the invention will be apparent to those of skill in the art from the detailed description.

According to a first aspect of the present invention, a reproduction method for reading out coded data which is obtained by coding video signals by three coding methods of an intra frame coding (I), a forward prediction coding (P), and a bidirectional prediction coding (B), the coded data constituting a GOP in a cycle of the intra frame coding, and being coded in a variable bit rate with a data amount of each GOP varying with images, from a coded data generating unit as a coded data stream, and decoding and outputting the coded data stream, comprises steps of: reproducing a coded data stream to be decoded from the coded data generating unit for a reproduction circuit; temporarily storing the coded data stream from the reproduction circuit in a first memory; reading out the coded data stream from the first memory to decode the same by the decoder circuit; temporarily storing decoded image data from the decoder circuit in a second memory; outputting the decoded image data from the second memory or the decoder circuit to an output circuit, as a video signal; storing coded data streams of one or more GOP units, or one or more data streams coded by the intra frame coding, which are previous to a coded data stream of a frame displayed at present, in a third memory provided at an output of the reproduction circuit or the first memory; controlling writing and reading of an address into and out of the third memory by a control circuit; and when an image displayed in the past should be displayed again, reading out and decoding a prescribed coded data stream stored in the third memory to quickly display the image displayed in the past, without reading out coded data again from the coded data generating unit. Therefore, a prescribed coded data stream can be read out from the third memory, without reading out past image data again from the coded data generating unit. Consequently, image data displayed in the past can be quickly detected and displayed.

According to a second aspect of the present invention, in the reproduction method according to the first aspect, coded data streams just before the frame displayed at present are stored in the third memory. Therefore, the reproduction head can send a desired past coded data stream instantaneously to the decoder circuit, without detecting the coded data stream.

According to a third aspect of the present invention, in the reproduction method according to the first or second aspect, coded data streams of plural GOP units are stored in the third memory, and the reproduction method comprises a step of controlling the third memory to read out data from a head of each GOP when the coded data streams stored in the third memory should be reproduced. Therefore, when a desired past coded data stream should be displayed, the seek time is not required, and a time required to display the coded data stream can be considerably reduced.

According to a fourth aspect of the present invention, in the reproduction method according to the first aspect, coded data streams arbitrarily designated by a user are stored in the third memory. Therefore, the user can freely select and set in advance a desired past coded data stream. Consequently, the desired past coded data stream can be quickly detected and displayed.

According to a fifth aspect of the present invention, in the reproduction method according to any of the first to fourth aspects, one memory is commonly used in the step of storing the coded data streams in the third memory and the step of storing the coded data streams in the first memory. Therefore, the number of memories can be reduced and the power consumption in the apparatus can be reduced, thereby reducing the cost of the whole apparatus.

According to a sixth aspect of the present invention, a reproduction apparatus for reading out coded data which is obtained by coding video signals by three coding methods of an intra frame coding (I), a forward prediction coding (P), and a bidirectional prediction coding (B), the coded data constituting a GOP in a cycle of the intra frame coding, and being coded in a variable bit rate with a data amount of each GOP varying with images, from a coded data generating unit as a coded data stream, and decoding and outputting the coded data stream, comprises: a reproduction circuit for reproducing a coded data stream to be decoded from the coded data generating unit; first memory means for temporarily storing the coded data stream from the reproduction circuit; a decoder circuit for reading out the coded data stream from the first memory means to decode the coded data stream; second memory means for temporarily storing decoded image data from the decoder circuit; an output circuit for outputting the decoded image data from the second memory means or the decoder circuit as a video signal; third memory means for receiving and storing coded data streams of one or more GOP units, or one or more data streams coded by the intra frame coding, which are previous to a coded data stream of a frame displayed at present, through an output of the reproduction circuit or the first memory means; and a control circuit for controlling writing and reading of an address into and out of the third memory means, wherein when an image displayed in the past should be displayed again, a prescribed coded data stream stored in the third memory means is read out and decoded to quickly display the image displayed in the past, without reading out coded data again from the coded data generating unit. Therefore, a prescribed coded data stream can be read out from the third memory, without reading out past image data again from the coded data generating unit. Consequently, image data displayed in the past can be quickly detected and displayed.

According to a seventh aspect of the present invention, in the reproduction apparatus according to the sixth aspect, the third memory means stores coded data streams just before the frame displayed at present. Therefore, the reproduction head can send a desired past coded data stream instantaneously to the decoder circuit, without detecting the coded data stream.

According to an eighth aspect of the present invention, in the reproduction apparatus according to the sixth or seventh aspect, the third memory means stores coded data streams of plural GOP units, and the reproduction apparatus comprises a control circuit for controlling the third memory means to read out data from a head of each GOP when the coded data streams stored in the third memory means should be reproduced. Therefore, when a desired past coded data stream should be displayed, the seek time is not required and a time required to display the coded data stream can be considerably reduced.

According to a ninth aspect of the present invention, in the reproduction apparatus according to the sixth aspect, the third memory means stores coded data streams arbitrarily designated by a user. Therefore, the user can freely select and set in advance a desired past coded data stream. Consequently, the desired past coded data stream can be quickly detected and displayed.

According to a tenth aspect of the present invention, in the reproduction apparatus according to any of sixth to ninth aspects, the one memory is commonly used for third memory means and the first memory means. Therefore, the number of memories can be reduced and the power consumption in the apparatus can be reduced, thereby reducing the cost of the whole apparatus.

According to an eleventh aspect of the present invention, a reproduction method for reading out coded data which is obtained by coding video signals by three coding methods of an intra frame coding (I), a forward prediction coding (P), and a bidirectional prediction coding (B), the coded data constituting a GOP in a cycle of the intra frame coding, and being coded in a variable bit rate with a data amount of each GOP varying with images, from a coded data generating unit as a coded data stream, and decoding and outputting the coded data stream, comprises steps of: reproducing a coded data stream to be decoded from the coded data generating unit for a reproduction circuit; temporarily storing the coded data stream from the reproduction circuit in a first memory; reading out the coded data stream from the first memory to decode the same by the decoder circuit; temporarily storing decoded image data from the decoder circuit in a second memory; outputting the decoded image data from the second memory or the decoder circuit to an output circuit, as a video signal; storing decoded image data of one or more frames which are decoded and displayed previously to a frame displayed at present, in a fourth memory provided at an output of the decoder circuit or the second memory; controlling writing and reading of the decoded image data into and out of the fourth memory by a control circuit; and when an image displayed in the past should be displayed again, reading out prescribed decoded image data stored in the fourth memory to quickly display the image displayed in the past, without reading out coded data again from the coded data generating unit. Therefore, prescribed decoded image data can be read out from the fourth memory, without reading out past image data again from the coded data generating unit. Consequently, image data displayed in the past can be quickly detected and displayed.

According to a twelfth aspect of the present invention, in the reproduction method according to the eleventh aspect, plural continuous decoded image data just before a frame displayed at present are stored in the fourth memory. Therefore, a time for detecting and decoding desired past decoded image data is not required to display the image data and the past decoded image data can be displayed quickly.

According to a thirteenth aspect of the present invention, in the reproduction method according to the eleventh aspect, decoded image data arbitrarily designated by a user are stored in the fourth memory. Therefore, the user can freely select and set in advance desired past decoded image data. Consequently, the desired past decoded image data can be quickly displayed.

According to a fourteenth aspect of the present invention, in the reproduction method according to any of the eleventh to thirteenth aspects, one memory is commonly used in the step of storing the decoded image data in the fourth memory and the step of storing the decoded image data in the second memory.

Therefore, the number of memories can be reduced and the power consumption in the apparatus can be reduced, thereby reducing the cost of the whole apparatus.

According to a fifteenth aspect of the present invention, a reproduction apparatus for reading out coded data which is obtained by coding video signals by three coding methods of an intra frame coding (I), a forward prediction coding (P), and a bidirectional prediction coding (B), the coded data constituting a GOP in a cycle of the intra frame coding, and being coded in a variable bit rate with a data amount of each GOP varying with images, from a coded data generating unit as a coded data stream, and decoding and outputting the coded data stream, comprises: a reproduction circuit for reproducing a coded data stream to be decoded from the coded data generating unit; first memory means for temporarily storing the coded data stream from the reproduction circuit; a decoder circuit for reading out the coded data stream from the first memory means to decode the same; second memory means for temporarily storing decoded image data from the decoder circuit; an output circuit for outputting the decoded image data from the second memory means or the decoder circuit as a video signal; fourth memory means for receiving and storing decoded image data of one or more frames which are decoded and displayed previously to a frame displayed at present, through an output of the decoder circuit or the second memory means; and a control circuit for controlling writing and reading of the decoded image data into and out of the fourth memory means, wherein when an image displayed in the past should be displayed again, prescribed decoded image data stored in the fourth memory means is read out to quickly display the image displayed in the past, without reading out coded data again from the coded data generating unit. Therefore, prescribed decoded image data can be read out from the fourth memory, without reading out past image data again from the coded data generating unit. Consequently, image data displayed in the past can be quickly detected and displayed.

According to a sixteenth aspect of the present invention, in the reproduction apparatus according to the fifteenth aspect, the fourth memory means stores plural continuous decoded image data just before a frame displayed at present. Therefore, a time is not required to detect and decode desired past decoded image data to display the image data, and the image data can be displayed quickly.

According to a seventeenth aspect of the present invention, in the reproduction apparatus according to the fifteenth aspect, the fourth memory means stores decoded image data arbitrarily designated by a user. Therefore, the user can freely select and set in advance desired past decoded image data. Consequently, the desired past decoded image data can be quickly displayed.

According to an eighteenth aspect of the present invention, in the reproduction apparatus according to any of the fifteenth to seventeenth aspects, one memory is commonly used for the fourth memory means and the second memory means. Therefore, the number of memories can be reduced and the power consumption in the apparatus can be reduced, thereby reducing the cost of the whole apparatus.

According to a nineteenth aspect of the present invention, in the reproduction method according to any of the first to fifth and eleventh to fourteenth aspects, the coded data generating unit generates coded data by reproducing from a storage type recording medium by a reproduction unit. Therefore, the mechanical seek time is not required, and past image data can be quickly reproduced from a storage type recording medium and displayed.

According to a twentieth aspect of the present invention, in the reproduction apparatus according to any of the sixth to tenth and fifteenth to eighteenth aspects, the coded data generating unit generates coded data by reproducing from a storage type recording medium by a reproduction unit. Therefore, the mechanical seek time is not required, and past image data can be quickly reproduced from a storage type recording medium and displayed.

According to a twenty-first aspect of the present invention, in the reproduction method according to any of the first to fifth and eleventh to fourteenth aspects, the coded data generating unit generates coded data by receiving broadcasting waves by a receiver. Therefore, the mechanical seek time is not required, and past image data can be quickly reproduced from received broadcasting, such as a broadcasting wave, and displayed.

According to a twenty-second aspect of the present invention, in the reproduction apparatus according to any of the sixth to tenth and fifteenth and eighteenth aspects, the coded data generating unit generates coded data by receiving broadcasting waves by a receiver. Therefore, the mechanical seek time is not required, and past image data can be quickly reproduced from received broadcasting, such as a broadcasting wave, and displayed.

DETAILED DESCRIPTION OF THE PREFERRED EMBODIMENTS

Embodiment 1

Hereinafter, the first embodiment of the present invention will be described with reference to FIGS. 1 and 3.

Figure 1:
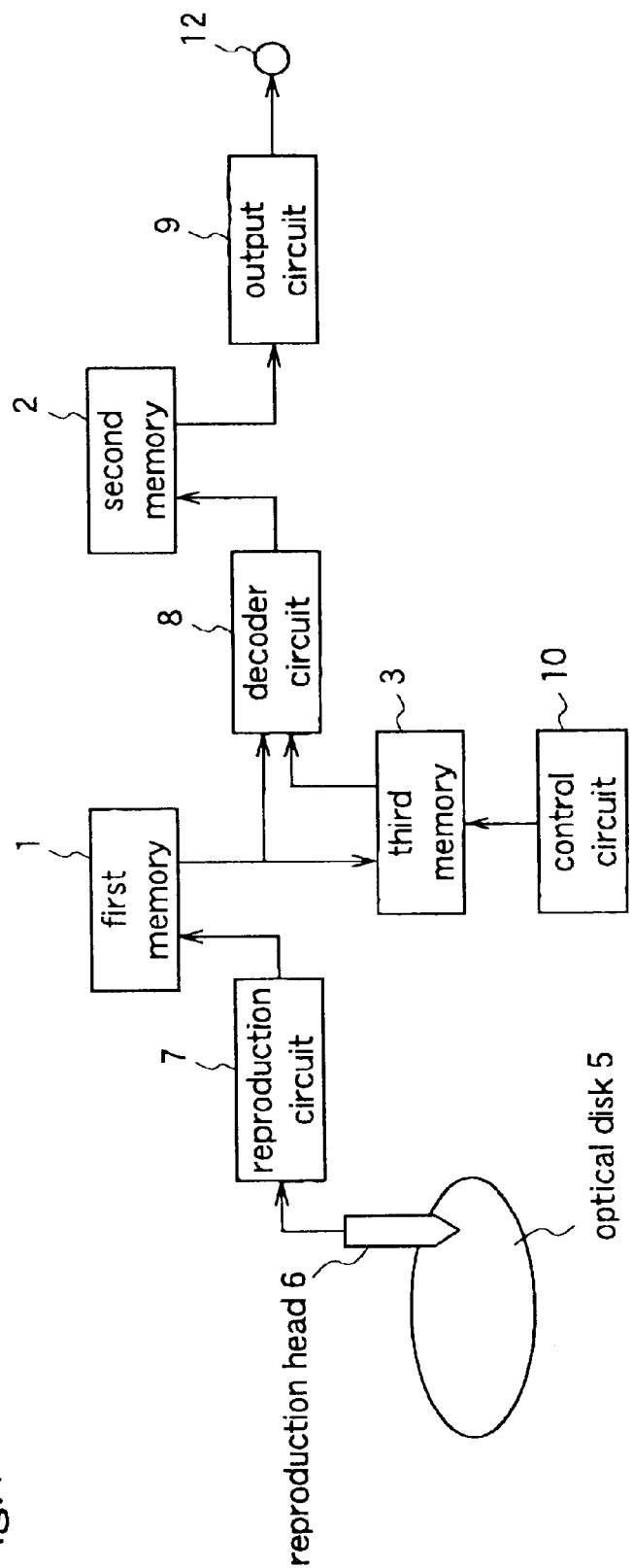
FIG. 1 is a block diagram illustrating a reproduction apparatus according to a first embodiment of the present invention.

FIG. 1 is a block diagram illustrating a reproduction apparatus according to the first embodiment.

In the figure, reference numeral 5 designates an optical disk on which video signals are recorded. Numeral 6 designates a reproduction head for reading out data stored on the optical disk 5. Numeral 7 designates a reproduction circuit for reproducing the data read out from the reproduction head 6. Numeral 1 designates a first memory for temporarily storing data of the reproduction circuit 7. Numeral 8 designates a decoder circuit for reading out and decoding the data stored in the first memory 1. Numeral 2 designates a second memory for temporarily storing the data decoded by the decoder circuit 8. Numeral 9 designates an output circuit for outputting the data stored in the second memory 2 as a video signal. Numeral 3 designates a third memory for storing coded data streams of several past GOP units previous to a frame which is displayed at present, the third memory 3 being provided at an output of the first memory 1. Numeral 10 designates a control circuit for controlling writing and reading of an address for the third memory 3.

An operation of a reproduction method and a reproduction apparatus according to the first embodiment, constructed as detailed above, will be described with reference to FIG. 1.

Initially, video signals are coded by the three coding methods of the intra frame coding (I), the forward prediction coding (P), and the bidirectional prediction coding (B). Then, a GOP is constituted by pictures in a cycle of the intra frame coding (I), and coded data which is coded in a variable bit rate, with a data amount of each GOP varying with images, is recorded on a storage type recording medium, such as the optical disk 5.

The reproduction head 6 reads out the coded data stored on the optical disk 5, the reproduction circuit 7 obtains a coded data stream, and the first memory 1 temporarily stores the coded data stream. The decoder circuit 8 read outs and decodes the data from the first memory 1 to generate a decoded signal, and the third memory 3 stores a past coded data stream. The decoded signal generated by the decoder circuit 8 is output as a video signal by the output circuit 9, through the second memory 2, and sent to the terminal 12.

Next, an operation of displaying a past frame will be described in detail, with reference to FIG. 3.

Figure 3:
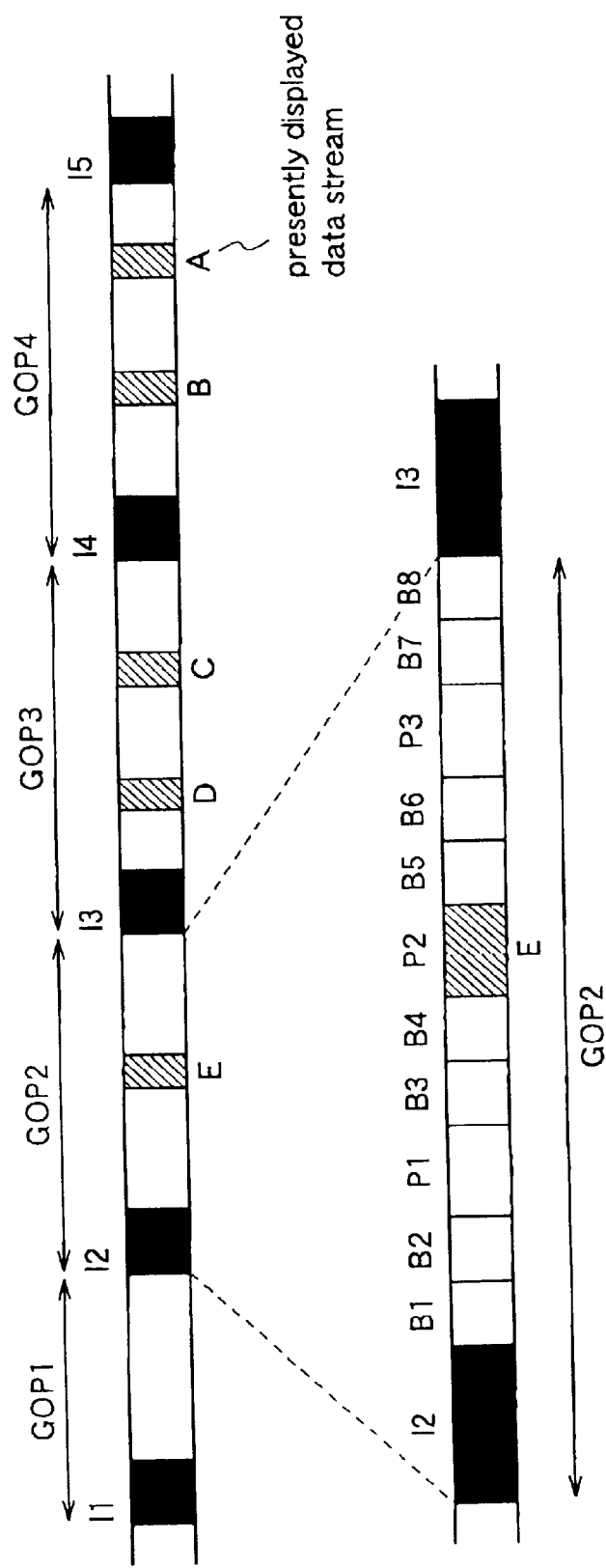
FIG. 3 is a diagram schematically illustrating a data arrangement of coded data streams on a track of an optical disk.

FIG. 3 is a diagram schematically illustrating a data arrangement of coded data streams on a track of an optical disk.

In the figure, each GOP usually comprises about 15 frames of data and the first frame of each GOP is coded by the intra frame coding (I). In addition, frames other than the first frame are coded by the forward prediction coding (P) or the bidirectional prediction coding (B).

Initially, it is assumed that a frame A is displayed at present. Then, it is assumed that frames B, C, D, and E, which are past information of the presently displayed frame A, should be displayed in this order. Here, the frames B to E are coded by any of the intra frame coding (I), the forward prediction coding (P), and the bidirectional prediction coding (B). Further, respective frames can be continuous or discontinuous.

In order to reproduce the frame B by the prior art method, the first frame (14) of a GOP including the frame B should be detected first from the optical disk 5 and decoded again to read out and display the frame B. Similarly, when the frame C should be reproduced, the first frame 13 of a GOP including the frame C is detected from the optical disk 5 and decoded, and then the frame C is read out. Further, when the frame D should be reproduced, the first frame 13 of a GOP including the frame D is detected again from the optical disk 5 and decoded, and then the frame D is read out. That is, in order to display the frames B to E in this order, it is necessary for the reproduction head 6 to seek the optical disk 5 four times.

However, in the first embodiment of the present invention, the third memory 3 stores the coded data streams of several GOP units just before the frame which is displayed at present. Therefore, in order to display the frame B, data of the first frame (14) of the GOP4 including the frame B is sent from the third memory 3 to the decoder circuit 8, and when the frame B is decoded, the frame B is displayed. Hereinafter, similar to the case of the frame B, when the frames C and D should be displayed, frames are read out from the first frame (13) of the GOP3 and when the frame E should be displayed, frames are read out from the first frame (12) of the GOP2.

In this case, it is unnecessary for the decoder circuit 8 to decode all frames from the first frame of a GOP to a desired frame. For example, only I (intra frame coding) frames and P (forward prediction coding) frames can be sought, without decoding B (bidirectional prediction coding) frames. Specifically, in order to display the frame E in the GOP2 shown in a lower row in FIG. 3, the first frame (12) of the GOP2 is read out first and then frames P1 and P2 are decoded, and it is unnecessary to decode frames B1 to B4.

Here, the number of GOPs which can be stored in the third memory 3 depends on a variable bit-rate and a capacity of the memory. For example, when a memory of a 64 Mbit capacity is used and a data rate is about 3 Mbps, it is possible to store coded data streams of about 20 sec., i.e., about 40 GOPs. Therefore, the third memory 3 can store data within past 20 sec., thereby requiring no seek time required by a reproduction apparatus which reads out data from the optical disk 5 according to the prior art method. Further, when going back to past data after more than 20 sec., a memory having a larger capacity is used as required.

In addition, when image data is reproduced in the reproduction apparatus, the third memory 3 is controlled so that it always stores a new data stream and that data streams in the memory are renewed according to the capacity of the memory. Therefore, data streams just before the presently displayed frame, up to an amount of the memory capacity, can be stored.

In FIG. 3, the third memory 3 stores the data of the frames just before the presently displayed frame in GOP units, but the memory can store other data. The third memory 3 can store GOPs designated by a user, or only I frame data designated by a user at a past reproduction. In the latter case, assuming that data of an I frame has 600 kbits, a 64 Mbit memory can store about 100 frames of image data. At this time, the control circuit 10 manages a head address of the I frame.

Here, while the third memory 3 receives and stores an output signal from the first memory 1 in FIG. 1, the third memory 3 can directly receive and store an output signal from the reproduction circuit 7.

Further, the third memory 3 can commonly use one memory with the first memory 1. In this case, the operations of the original first memory 1 and the third memory 3 can be divided and managed by addresses in the first memory 1.

As described above, according to the reproduction method and the reproduction apparatus of the first embodiment, the third memory 3 is provided at the output of the reproduction circuit 7 or the first memory 1, and the coded data streams of several past GOP units which are previous to the presently displayed frame, or the coded data streams just before the presently displayed frame are stored in the third memory 3. Thereby, when image data displayed in the past should be displayed again, a prescribed coded data stream can be read out from the third memory 3, without reading out the past image data again from the coded data generating unit. Therefore, the image data displayed in the past can be quickly detected and displayed.

In addition, the user arbitrarily designates the coded data streams stored in the third memory 3, whereby the user can select freely and set in advance desired past data streams. Therefore, the desired past data streams can be quickly detected and displayed.

Further, one memory is commonly used for the third memory 3 and the first memory 1, thereby reducing the number of memories. Further, the power consumption in the apparatus can be reduced and the cost of the whole apparatus can be lowered.

Embodiment 2

Hereinafter, the second embodiment of the present invention will be described with reference to FIG. 2.

Figure 2:
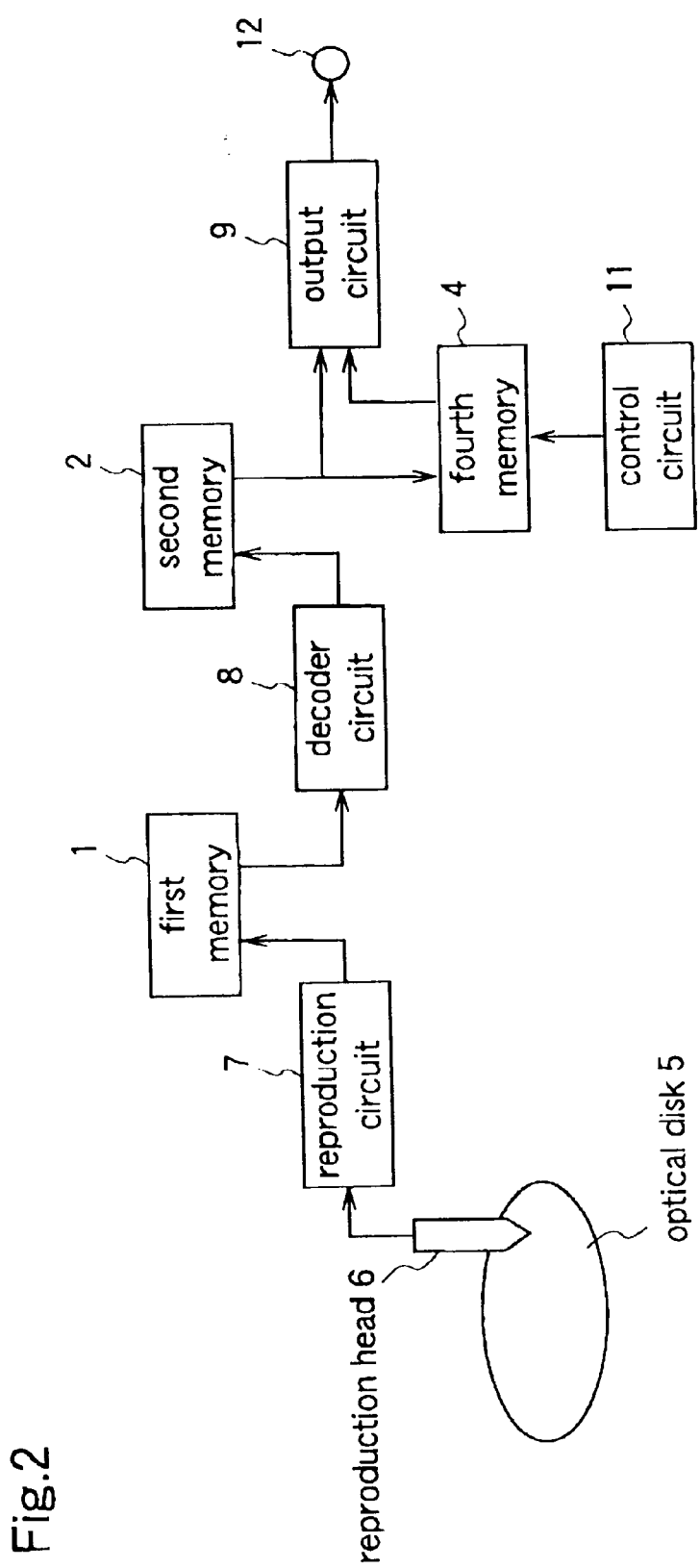
FIG. 2 is a block diagram illustrating a reproduction apparatus according to a second embodiment of the present invention.

FIG. 2 is a block diagram illustrating a reproduction apparatus according to the second embodiment. Here, the same reference numerals as those in the first embodiment designate the same structures or operations, and their description is omitted here.

In the figure, numeral 4 designates a fourth memory for storing decoded image data of past several frames previous to the presently displayed frame, the fourth memory being provided at an output of the second memory 2. Numeral 11 designates a control circuit for controlling writing and reading for the fourth memory 4.

An operation of a reproduction method and a reproduction apparatus according to the second embodiment, constructed as detailed above, will be described with reference to FIG. 2.

Initially, video signals are coded by the three coding methods of the intra frame coding (I), the forward prediction coding (P), and the bidirectional prediction coding (B). Then, a GOP is constituted by pictures in a cycle of the intra frame coding (I), and coded data which is coded in a variable bit rate, with a data amount of each GOP varying with images, is recorded on a storage type recording medium, such as the optical disk 5.

The reproduction head 6 reads out the coded data stored on the optical disk 5, the reproduction circuit 7 obtains a coded data stream, and the first memory 1 temporarily stores the coded data stream. The decoder circuit 8 read outs and decodes the data from the first memory 1 to generate a decoded signal. The decoded signal generated by the decoder circuit 8 is temporarily stored in the second memory 2. The output circuit 9 outputs data from the second memory 2 as a video signal to the terminal 12, and the fourth memory 4 stores past decoded image data.

Next, an operation of displaying past decoded image data will be described in detail, with reference to FIG. 4.

Figure 4:
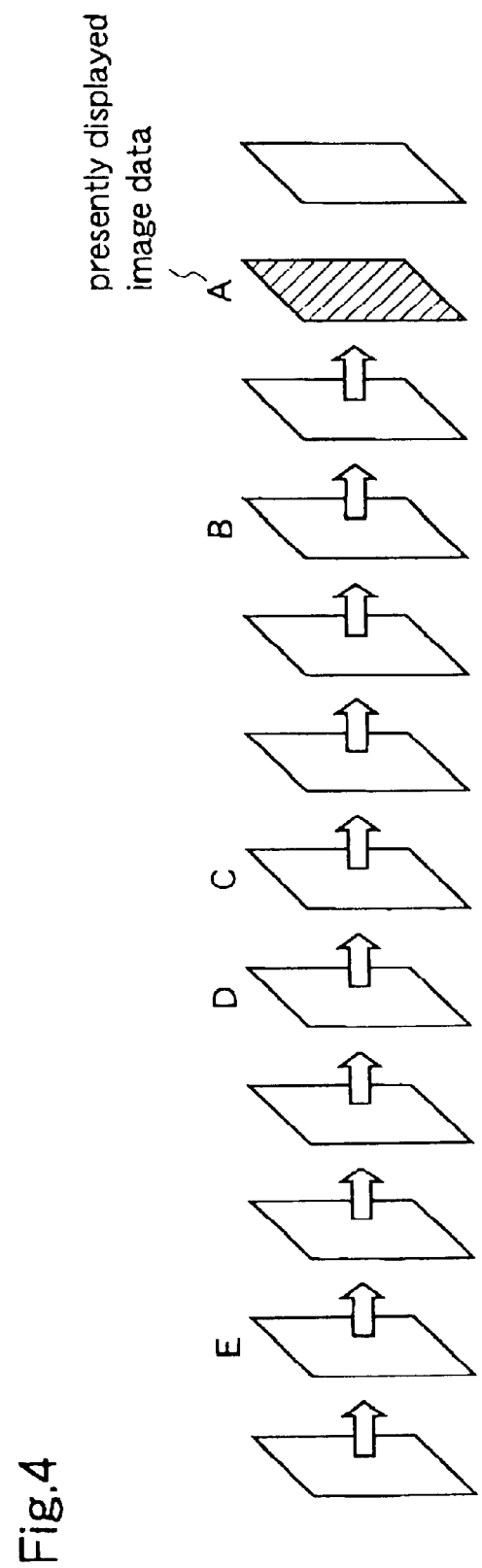
FIG. 4 is diagram schematically illustrating an arrangement of decoded image data which is decoded by a decoder circuit according to the second embodiment.
Figure 5:
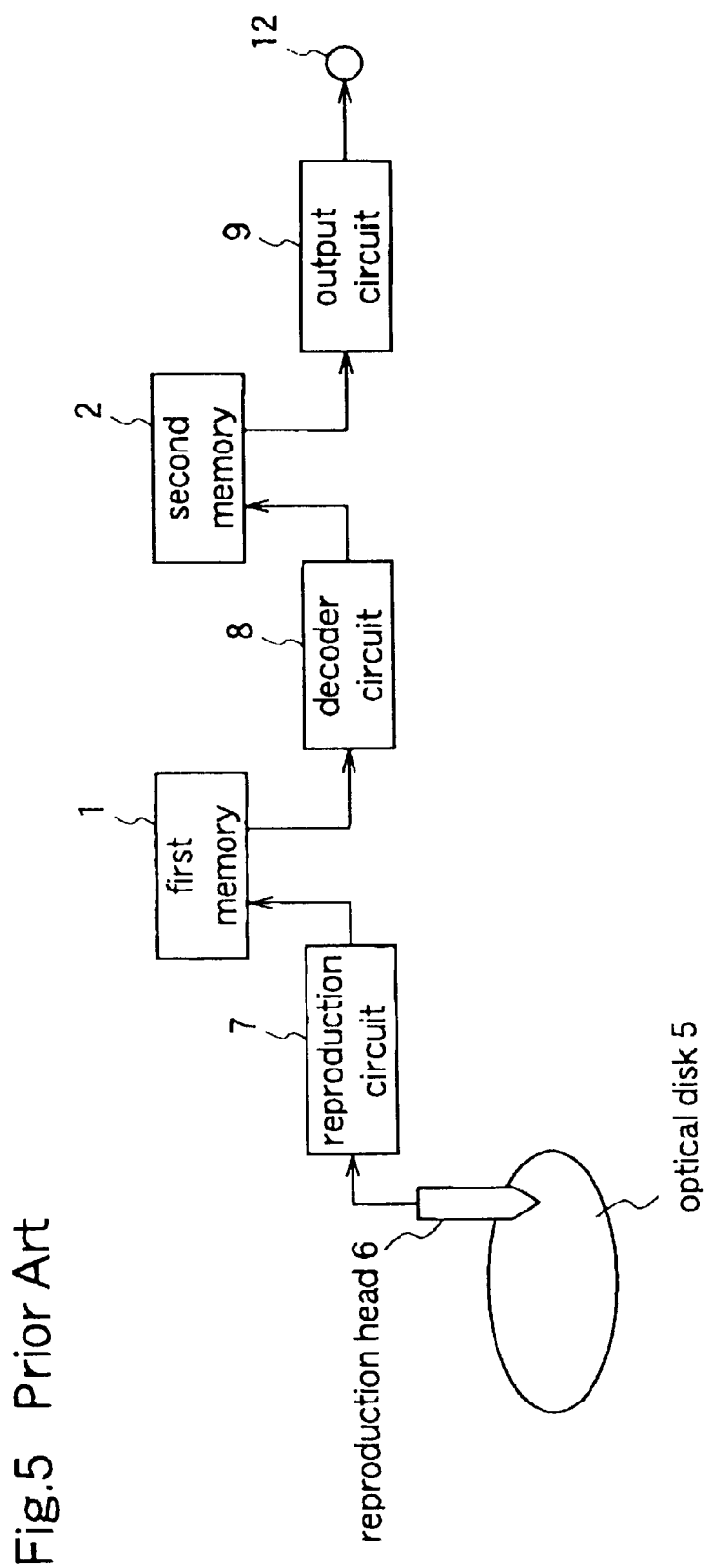
FIG. 5 is a block diagram illustrating a prior art reproduction apparatus.

FIG. 4 is a diagram schematically illustrating an arrangement of decoded image data which is decoded by the decoder circuit 8.

In the figure, a quadrilateral shows each decoded image data, and arrows show a decoding order.

First, it is assumed that a frame A is displayed at present. Then, it is assumed that frames B, C, D, E, which are past information of the frame A displayed at present, should be displayed in this order. In this case, the frames B to E are coded by any of the intra frame coding (I), the forward prediction coding (P), and the bidirectional prediction coding (B). Further, respective frames can be continuous or discontinuous.

In order to display the frame B, data of the frame B is read out directly from the fourth memory 4 and output to the output circuit 9 to display the frame B. Hereinafter, similar to the case of the frame B, when the frames C, D, and E should be displayed, data of the frames is read out directly from the fourth memory 4 to display the frames instantaneously.

Here, the number of frames which can be stored in the fourth memory 4 depends on the capacity of the memory. For example, when a memory having a 256 Mbit capacity is used, the memory can store 50–60 frames of image data. That is, image data within past several tens of frames can be displayed instantaneously.

While the fourth memory 4 stores data of the frames just before the presently displayed frame in FIG. 4, the memory can store data of arbitrary past frames designated by the user.

Here, while the fourth memory 4 receives and stores the output signal from the second memory 2 in FIG. 2, the memory can directly receive and store the output signal from the decoder circuit 8.

Further, the fourth memory 4 can commonly use one memory with the second memory 2. In this case, the operations of the original second memory 2 and the fourth memory 4 can be divided and managed by addresses, within the second memory 2.

While in the first and second embodiments the optical disk 5 is used as an example for the coded data generating unit, other storage type recording media, such as an optical magnetic disk, a magnetic disk, a hard disk, and a magnetic tape, can be used. Further, as the coded data generating unit, devices for receiving MPEG streams, such as satellite broadcasting, digital ground wave broadcasting, and cable television broadcasting, can be also used. That is, past image data can be displayed quickly also in a broadcasting receiving apparatus which receives the MPEG streams. In this case, an antenna, a cable or the like are connected in place of the optical disk 5 and the reproduction head 6, shown in FIGS. 1 and 2.

As described above, according to the reproduction method and the reproduction apparatus of the second embodiment, the fourth memory 4 is provided at the output of the decoder circuit 8 or the second memory 2, and the fourth memory 4 stores past decoded image data which is previous to the presently displayed frame. Thereby, when image data displayed in the past should be displayed again, prescribed decoded image data can be read out directly from the fourth memory 4, without reading out the past image data again from the coded data generating unit or detecting the first frame of a GOP according to the first embodiment. Therefore, the image data displayed in the past can be quickly detected and displayed.

In addition, the user arbitrarily designates decoded image data stored in the fourth memory 4, and the user can freely select and set in advance desired past image data. Therefore, the desired past image data can be quickly detected and displayed.

Further, one memory is commonly used for the fourth memory 4 and the second memory 2, thereby reducing the number of memories. Further, the power consumption in the apparatus can be reduced and the cost of the whole apparatus can be lowered.

Furthermore, a storage type recording medium, such as an optical disk, or a receiving unit which receives broadcasting waves, is used as the coded data generating unit, and data from various media can be reproduced. In addition, past image data can be quickly detected and displayed when image data is received from any type of media.

What is claimed is:

1. A reproduction method for reading out coded data which is obtained by coding video signals by three coding methods of an intra frame coding (I), a forward prediction coding (P), and a bidirectional prediction coding (B), the coded data constituting a group of pictures (GOP) in a cycle of the intra frame coding, and being coded in a variable bit rate with a data amount of each GOP varying with images, from a coded data generating unit as a coded data stream, and decoding and outputting the coded data stream, said reproduction method comprising:

reproducing the coded data stream from the coded data generating unit by a reproduction circuit;

temporarily storing the coded data stream from the reproduction circuit in a first memory;

reading out the coded data stream from the first memory to decode the coded data stream by a decoder circuit;

temporarily storing decoded image data from the decoder circuit in a second memory;

outputting the decoded image data from the second memory or the decoder circuit to an output circuit, as a video signal;

storing coded data streams of one or more GOP units, or one or more data streams coded by the intra frame coding, which are previous to a coded data stream of a frame presently displayed, in a third memory provided at an output of the reproduction circuit or the first memory;

controlling writing and reading of an address into and out of the third memory by a control circuit; and when an image previously displayed is to be displayed again, reading out and decoding a prescribed coded data stream stored in the third memory to redisplay the image previously displayed, without reading out coded data again from the coded data generating unit.

2. The reproduction method of claim 1, wherein said storing comprises storing coded data streams of one or more GOP units or one or more data streams coded by the intra frame coding just before the frame presently displayed in the third memory.

3. The reproduction method of claim 2, wherein said storing comprises storing, coded data streams of a plurality of GOP units in the third memory, and controlling the third memory to read out data from a head of each GOP when the coded data streams stored in the third memory are to be reproduced.

4. The reproduction method of claim 1, wherein said storing comprises storing coded data streams of one or more GOP units or one or more data streams coded by the intra frame coding, that are arbitrarily designated by a user in the third memory.

5. The reproduction method of claim 4 wherein the third memory and the first memory are a same memory.

6. A reproduction apparatus for reading out coded data which is obtained by coding video signals by three coding methods of an intra frame coding (I), a forward prediction coding (P), and a bidirectional prediction coding (B), the coded data constituting a group of pictures (GOP) in a cycle of the intra frame coding, and being coded in a variable bit rate with a data amount of each GOP varying with images, from a coded data generating unit as a coded data stream, and decoding and outputting the coded data stream, said reproduction apparatus comprising:

a reproduction circuit for reproducing the coded data stream from the coded data generating unit;

a first memory for temporarily storing the coded data stream from said reproduction circuit;

a decoder circuit for reading out the coded data stream from said first memory to decode the coded data stream;

a second memory for temporarily storing decoded image data from said decoder circuit;

an output circuit for outputting the decoded image data from said second memory or said decoder circuit as a video signal;

a third memory for receiving and storing coded data streams of one or more GOP units or one or more data streams coded by the intra frame coding, which are previous to a coded data stream of a frame presently displayed, through an output of said reproduction circuit or said first memory; and a control circuit for controlling writing and reading of an address into and out of said third memory, wherein when an image previously displayed is to be displayed again, a prescribed coded data stream stored in said third memory is read out and decoded to redisplay the image previously displayed, without reading out coded data again from the coded data generating unit.

7. The reproduction apparatus of claim 6, wherein said third memory stores coded data streams of one or more GOP units or one or more data streams coded by the intra frame coding that are just before the frame presently displayed.

8. The reproduction apparatus of claim 7, wherein said third memory stores coded data streams of a plurality of GOP units, and said reproduction apparatus further comprises a control circuit for controlling said third memory to read out data from a head of each GOP when the coded data streams stored in said third memory are to be reproduced.

9. The reproduction apparatus of claim 6, wherein said third memory means stores coded data streams of one or more GOP units or one or more data streams coded by the intra frame coding that are arbitrarily designated by a user.

10. The reproduction apparatus of claim 9, wherein said third memory and said first memory are a single memory.

11. A reproduction method for reading out coded data which is obtained by coding video signals by three coding methods of an intra frame coding (I), a forward prediction coding (P), and a bidirectional prediction coding (B), the coded data constituting a group of pictures (GOP) in a cycle of the intra frame coding, and being coded in a variable bit rate with a data amount of each GOP varying with images, from a coded data generating unit as a coded data stream, and decoding and outputting the coded data stream, said reproduction method comprising:

reproducing the coded data stream from the coded data generating unit by a reproduction circuit;

temporarily storing the coded data stream from the reproduction circuit in a first memory;

reading out the coded data stream from the first memory to decode the coded data stream by a decoder circuit;

temporarily storing decoded image data from the decoder circuit in a second memory;

outputting the decoded image data from the second memory or the decoder circuit to an output circuit, as a video signal;

storing decoded image data of one or more frames which are decoded and displayed previously to a frame presently displayed, in a third memory provided at an output of the decoder circuit or the second memory;

controlling writing and reading of the decoded image data into and out of the third memory by a control circuit; and when an image previously displayed is to be displayed again, reading out prescribed decoded image data stored in the third memory to redisplay the image previously displayed, without reading out coded data again from the coded data generating unit.

12. The reproduction method of claim 11, wherein said storing comprises storing plural continuous decoded image data just before a frame presently displayed in the third memory.

13. The reproduction method of claim 11, wherein said storing comprises storing decoded image data arbitrarily designated by a user in the third memory.

14. The reproduction method of claim 13, wherein the third memory and the second memory are a single memory.

15. A reproduction apparatus for reading out coded data which is obtained by coding video signals by three coding methods of an intra frame coding (I), a forward prediction coding (P), and a bidirectional prediction coding (B), the coded data constituting a group of pictures (GOP) in a cycle of the intra frame coding, and being coded in a variable bit rate with a data amount of each GOP varying with images, from a coded data generating unit as a coded data stream, and decoding and outputting the coded data stream, said reproduction apparatus comprising:

a reproduction circuit for reproducing the coded data stream from the coded data generating unit;

a first memory for temporarily storing the coded data stream from said reproduction circuit;

a decoder circuit for reading out the coded data stream from said first memory to decode the coded data stream;

a second memory for temporarily storing decoded image data from said decoder circuit;

an output circuit for outputting the decoded image data from said second memory or said decoder circuit as a video signal;

a third memory for receiving and storing decoded image data of one or more frames which have been decoded and displayed previously to a frame presently displayed, through an output of said decoder circuit or said second memory; and a control circuit for controlling writing and reading of the decoded image data into and out of said third memory, wherein when an image previously displayed is to be displayed again, prescribed decoded image data stored in said third memory is read out to redisplay the image previously displayed, without reading out coded data again from the coded data generating unit.

16. The reproduction apparatus of claim 15, wherein said third memory stores plural continuous decoded image data just before a frame presently displayed.

17. The reproduction apparatus of claim 15, wherein said third memory stores decoded image data arbitrarily designated by a user.

18. The reproduction apparatus of claim 17, wherein said third memory and said second memory are a single memory.

19. The reproduction method of claim 1, wherein the coded data generating unit generates coded data by reproducing a storage type recording medium by a reproduction unit.

20. The reproduction apparatus of claim 6, wherein the coded data generating unit generates coded data by reproducing a storage type recording medium by a reproduction unit.

21. The reproduction method of claim 1, wherein
the coded data generating unit generates coded data by receiving broadcasting waves by a receiver.
22. The reproduction apparatus of claim 6, wherein
the coded data generating unit generates coded data by receiving broadcasting waves by a receiver.
23. The reproduction method of claim 1, wherein
said storing comprises storing coded date streams of a plurality of GOP units in the third memory, and
controlling the third memory to read out data from a head of each GOP when the coded data streams stored in the third memory are to be reproduced.
24. The reproduction method of claim 3, wherein
the third memory and the first memory are a same memory.
25. The reproduction method of claim 2, wherein
the third memory and the first memory are a same memory.
26. The reproduction method of claim 1, wherein
the third memory and the first memory are a single memory.
27. The reproduction apparatus of claim 6, wherein
said third memory stores coded data streams of a plurality of GOP units, and
said reproduction apparatus further comprises a control circuit for controlling said third memory to read out data from a head of each GOP when the coded data streams stored in said third memory are to be reproduced.
28. The reproduction apparatus of claim 8, wherein
said third memory and said first memory are a single memory.
29. The reproduction apparatus of claim 7, wherein
said third memory and said first memory are a single memory.
30. The reproduction apparatus of claim 6, wherein
said third memory and said first memory are a single memory.
31. The reproduction method of claim 12, wherein
the third memory and the second memory are a single memory.
32. The reproduction method of claim 11, wherein
the third memory and the second memory are a single memory.
33. The reproduction apparatus of claim 17, wherein
said third memory and said second memory are a single memory.
34. The reproduction apparatus of claim 16, wherein
said third memory and said second memory are a single memory.
35. The reproduction method of claim 2, wherein
the coded data generating unit is a storage type recording medium.
36. The reproduction method of claim 3, wherein
the coded data generating unit is a storage type recording medium.
37. The reproduction method of claim 4, wherein
the coded data generating unit is a storage type recording medium.
38. The reproduction method of claim 5, wherein
the coded data generating unit is a storage type recording medium.
39. The reproduction method of claim 11, wherein
the coded data generating unit is a storage type recording medium.
40. The reproduction method of claim 12, wherein
the coded data generating unit is a storage type recording medium.
41. The reproduction method of claim 13, wherein
the coded data generating unit is a storage type recording medium.
42. The reproduction method of claim 14, wherein
the coded data generating unit is a storage type recording medium.
43. The reproduction apparatus of claim 7, wherein
the coded data generating unit is a storage type recording medium.
44. The reproduction apparatus of claim 8, wherein
the coded data generating unit is a storage type recording medium.
45. The reproduction apparatus of claim 9, wherein
the coded data generating unit is a storage type recording medium.
46. The reproduction apparatus of claim 10, wherein
the coded data generating unit is a storage type recording medium.
47. The reproduction method of claim 2, wherein
the coded data generating unit is a receiver for receiving broadcasting waves.
48. The reproduction method of claim 3, wherein
the coded data generating unit is a receiver for receiving broadcasting waves.
49. The reproduction method of claim 4, wherein
the coded data generating unit is a receiver for receiving broadcasting waves.
50. The reproduction method of claim 5, wherein
the coded data generating unit is a receiver for receiving broadcasting waves.
51. The reproduction method of claim 11, wherein
the coded data generating unit is a receiver for receiving broadcasting waves.
52. The reproduction method of claim 12, wherein
the coded data generating unit is a receiver for receiving broadcasting waves.
53. The reproduction method of claim 13, wherein
the coded data generating unit is a receiver for receiving broadcasting waves.
54. The reproduction method of claim 14, wherein
the coded data generating unit is a receiver for receiving broadcasting waves.
55. The reproduction apparatus of claim 7, wherein
the coded data generating unit is a receiver for receiving broadcasting waves.
56. The reproduction apparatus of claim 8, wherein
the coded data generating unit is a receiver for receiving broadcasting waves.
57. The reproduction apparatus of claim 9, wherein
the coded data generating unit is a receiver for receiving broadcasting waves.
58. The reproduction apparatus of claim 10, wherein
the coded data generating unit is a receiver for receiving broadcasting waves.

59. The reproduction apparatus of claim 15, wherein the coded data generating unit is a receiver for receiving broadcasting waves.

60. The reproduction apparatus of claim 16, wherein the coded data generating unit is a receiver for receiving broadcasting waves.

61. The reproduction apparatus of claim 17, wherein the coded data generating unit is a receiver for receiving broadcasting waves.

62. The reproduction apparatus of claim 18, wherein the coded data generating unit is a receiver for receiving broadcasting waves.

\* \* \* \* \*